(12) United States Patent
Addy

(10) Patent No.: US 7,116,221 B2
(45) Date of Patent: Oct. 3, 2006

(54) WI-FI PREMISES TO VEHICLE TELEMATICS INTERFACE

(75) Inventor: Kenneth L. Addy, Massapequa, NY (US)

(73) Assignee: Honeywell International, Inc., Morristown, NJ (US)

( * ) Notice: Subject to any disclaimer, the term of this patent is extended or adjusted under 35 U.S.C. 154(b) by 113 days.

(21) Appl. No.: 10/896,590

(22) Filed: Jul. 22, 2004

(65) Prior Publication Data

US 2006/0017565 A1      Jan. 26, 2006

(51) Int. Cl.
*G08B 1/08* (2006.01)

(52) U.S. Cl. ............................. 340/539.14; 340/425.5; 340/541; 340/5.3; 340/5.33

(58) Field of Classification Search .......... 340/539.14, 340/539.16, 541, 565, 691.6, 5.3, 5.33, 506, 340/517, 425.5, 521; 701/1; 348/143, 148
See application file for complete search history.

(56) References Cited

U.S. PATENT DOCUMENTS

| | | | | |
|---|---|---|---|---|
| 6,131,019 A | * | 10/2000 | King | 455/99 |
| 6,424,888 B1 | * | 7/2002 | Sone et al. | 701/1 |
| 6,970,082 B1 | * | 11/2005 | Reese et al. | 340/541 |
| 2005/0128068 A1 | * | 6/2005 | Winick et al. | 340/517 |

* cited by examiner

*Primary Examiner*—Toan N. Pham
(74) *Attorney, Agent, or Firm*—Scully, Scott, Murphy & Presser, P.C.

(57) ABSTRACT

A Wi-Fi (Wireless-Fidelity) premises/home to vehicle telematics interface system is provided that uses Wi-Fi technology to enable communications between a control panel of a security system protecting a premises and a vehicle. The vehicle is equipped with a Wi-Fi transceiver and processor that enable Wi-Fi data communications and a monitor/display that is preferably integrated into the dashboard display of the vehicle. The invention enables the status of a residential or business security system to be monitored and updated from a vehicle, such as before a homeowner enters the residence protected by the security system, and also allows the security system to monitor the status of and control functions of the vehicle.

22 Claims, 1 Drawing Sheet

WI-FI PREMISES TO VEHICLE TELEMATICS INTERFACE

BACKGROUND OF THE INVENTION

1. Field of the Invention

The present invention relates generally to a Wi-Fi (Wireless-Fidelity) premises/home to vehicle telematics interface system and method that uses Wi-Fi technology to enable communications between a security system protecting a premises and a vehicle. The vehicle is equipped with a Wi-Fi transceiver and processor that allow Wi-Fi data communications and a monitor/display that is preferably integrated into the dashboard display of the vehicle.

2. Discussion of the Prior Art

Security system installations frequently place video cameras and security monitoring sensors, such as intrusion sensors and motion detectors, throughout and around the perimeter of a protected space to detect the presence of an intruder. The status of the security system and the video camera recordings are frequently available for review within the protected space, such as on a security console and video display. Typically a central security station at a distant location can also review the status of the complete security system and camera recordings by communications over a telephone line and/or cable network and/or internet connection and/or radio frequency link.

However in many present security systems for residential home and commercial properties, a person or homeowner entering the premises cannot review the status of the complete security system or view the video camera recordings prior to entering the premises because the status and video recordings are only available for viewing inside the premises. This restriction may allow the person entering the premises to inadvertently walk into a burglary in progress in the protected premises without the security system giving any forewarning to the person of the burglary.

SUMMARY OF THE INVENTION

The present invention provides a Wi-Fi premises/home to vehicle telematics interface system and method that uses Wi-Fi technology to enable communications between a control panel of a security system protecting a premises and a vehicle. The vehicle is equipped with a Wi-Fi transceiver and a processor to enable Wi-Fi data communications and a monitor/display that is preferably integrated into the dashboard display of the vehicle.

The present invention enables the status of a residential or business security system to be monitored and updated from a vehicle, such as before a homeowner enters the residence protected by the security system, and also allows the security system to monitor the status of the vehicle.

The present invention provides an interface system and method for providing Wi-Fi communications between a security system for a premises, such as a residential or commercial building, and a vehicle, such an automobile, SUV or commercial van or truck, having a Wi-Fi transceiver, a processor and a monitor/display.

BRIEF DESCRIPTION OF THE DRAWINGS

The foregoing objects and advantages of the present invention for a Wi-Fi premises to vehicle telematics interface may be more readily understood by one skilled in the art with reference being had to the following detailed description of several embodiments thereof, taken in conjunction with the accompanying drawings in which.

DETAILED DESCRIPTION OF THE INVENTION

Wi-Fi, or Wireless Fidelity, enables data communications from any Wi-Fi enabled site, such as a vehicle, home, office, or other public areas equipped with Wi-Fi access such as airports, hotels, coffee shops, etc. Wi-Fi uses wireless technology to allow Wi-Fi enabled computers and processors to send and receive data anywhere within the range of a base station.

Wi-Fi cellular technology enables data communications over a laptop or portable computer or processor to allow a person to perform computer enabled tasks, such as retrieving files or presentations from a corporate network, sending or retrieving email, or cruising the Internet, from any Wi-Fi enabled site, such as a vehicle, room, or company conference room.

During automobile/vehicle model year 2007, the first vehicles equipped with Wi-Fi access capability will bercome available commercially. One use of Wi-Fi in a vehicle is to allow audio juke-boxes to replace or augment vehicular in-dash entertainment systems. Thus a car can be connected by Wi-Fi to enable downloading of MP3 music files from a home PC.

The present invention uses a vehicle's Wi-Fi access to enable communications between the vehicle and a security and/or HVAC (heating, ventilation, air conditioning) system for a home or business. The present invention can use a Wi-Fi enabled vehicle to display the current status of a security system for a premises before a person enters the premises, providing a real security benefit.

The present invention can also use a vehicle's Wi-Fi access to allow a security system for a residential or commercial business premises to monitor the status of and also to control some functions of the vehicle. For example, tire pressure, fuel level, etc. warnings may be presented to a homeowner as a reminder/warning before the homeowner leaves home. Also, the vehicle and outside temperature can be monitored using the vehicle's sensors. Locks, etc. can be controlled remotely.

Figure 1:
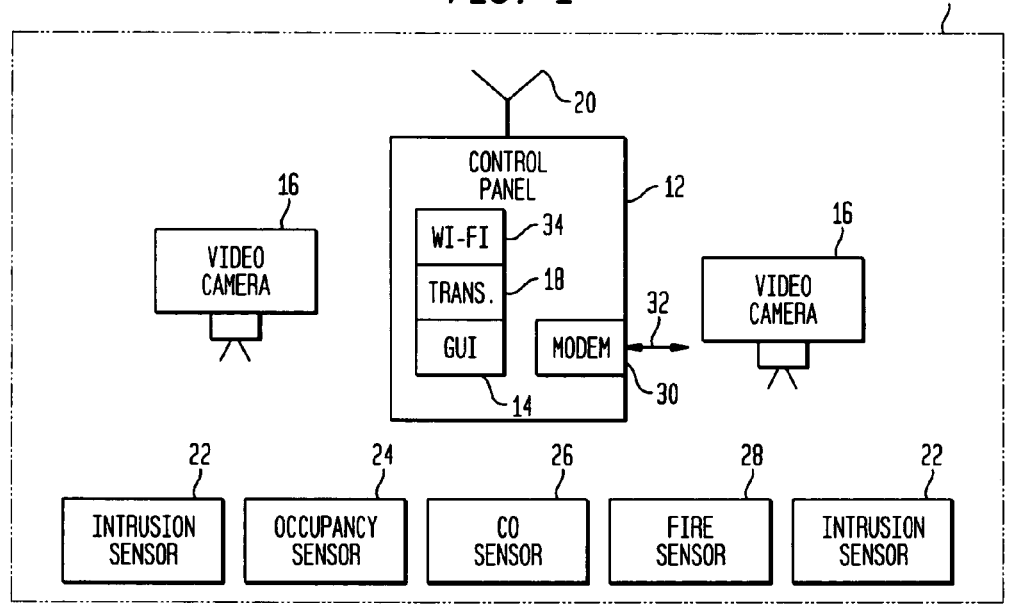
FIG. 1 illustrates a security system for a residential or commercial premises that typically comprises a security system control panel provided at a central accessible location, such as just inside the front entrance to the residential premises, security sensors and security video cameras.

FIG. 1 illustrates a typical security system for a protected space such as a residential or commercial premises 10 that typically comprises a security system control panel 12 provided at a central accessible location, such as just inside the front entrance to the premises protected by the security alarm system. The control panel provides a person or homeowner with a display 14 of information on the complete status of the security system, such as a display of pertinent parameters and conditions of the security system, and also possibly provides a display of video images provided by the security system video cameras 16.

The control panel also enables a person to control operation of the security system, such as arming or disarming of the security system by entry of a proper security code and of specific commands. The control panel typically includes a GUI display (graphical user interface) 14 to enable a user to view the status of the security alarm system and also to enter data into and access and control the security system. The security system might be a wireless system with many of the communications between sensors and the control panel being by short range (up to 1 mile) RF communication transmissions by a transceiver 18 and antenna 20.

A typical residential or commercial security system also includes a plurality of intrusion security sensors 22 mounted at doors and windows to detect any intrusions thereat and motion/occupancy sensors 24 mounted at strategic locations in the premises to detect the presence of a person thereat which are connected by security system wiring to the security system control panel. A typical security system might also include one or more CO sensors 26 and smoke or fire sensors 28 mounted at strategic locations in the premises to detect any of those conditions in the premises, with those sensors also being connected by security system wiring to the security system control panel. The security system control panel monitors signals from the security system sensors and video cameras to determine the status of the security system.

A typical residential or commercial security system might also include a modem 30 and a telephone line or cable connection to allow bi-directional data communications over telephone lines and/or a cable system and/or the internet and/or a radio frequency link, as indicated schematically at 32. The security system control panel might or might not include direct Wi-Fi access by a Wi-Fi transceiver 34 and antenna, to directly transmit and receive Wi-Fi transmitted data.

Figure 2:
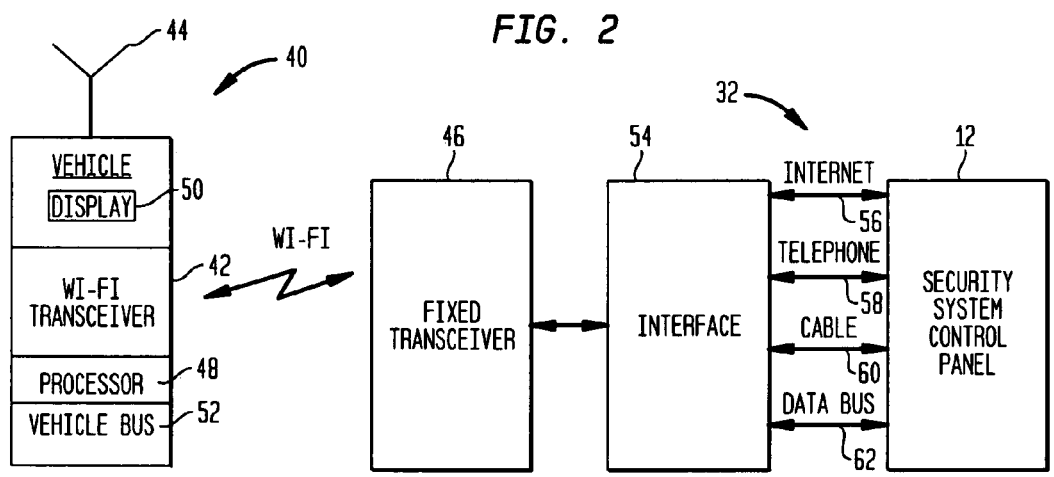
FIG. 2 illustrates the equipment on a vehicle provided with Wi-Fi access, including a Wi-Fi transceiver and antenna to transmit and receive Wi-Fi transmitted data, a processor to control the Wi-Fi data communications, and a video display that is preferably integrated into the dashboard display of the vehicle.

FIG. 2 illustrates a vehicle 40, such as an automobile, SUV, van or truck, that is provided with Wi-Fi access by a Wi-Fi transceiver 42 and antenna 44 to transmit and receive Wi-Fi transmitted data. Wi-Fi is wireless technology that allows Wi-Fi enabled computers and processors to send and receive data anywhere within the range of a base transceiver station, one of which is illustrated schematically at 46. The vehicle 40 is equipped with a Wi-Fi enabled (by 42, 44) processor 48 to enable Wi-Fi data communications and a monitor/display 50 that is preferably integrated into the dashboard display of the vehicle.

Bi-directional Wi-Fi data transmissions between the vehicle 40 and the base station 46 are directed through a controlled and programmed interface 54 which directs the data transmissions to the security system control panel 12 over any available common data transmission line, such as over an Internet connection 56 or over telephone lines 58 or over a cable connection 60 or over a proprietary data bus 62, or some combination thereof, to access and control the security system control panel.

In one embodiment of the present invention, the processor is coupled to the vehicle control bus (e.g. a CAN bus or other industry standard vehicle bus) 52 to allow the processor to monitor the status of the vehicle and also to control some functions of the vehicle. As an example, this feature can enable a person to display the vehicle's safety status (e.g. tire pressures) on the display 14 of the security system, or to control a function, such as starting of the vehicle engine, before the person enters and drives the vehicle.

The Wi-Fi enabled transceiver in the vehicle allows the vehicle to transmit and receive Wi-Fi transmitted data to enable a homeowner in the vehicle to review the status of the security system, and also possibly to review video images provided by the security system video cameras, to determine if it is safe to enter the security system protected premises before the person actually enters.

Moreover, future control panels for security systems within a home or business premises will likely be connected to a home or business network via an Ethernet or similar protocol. With such a network connected system, the user interface of the home security system can treat the vehicle as a partition with various "zone types" to be displayed locally.

In different embodiments, the video display 50 can be integrated into a display on the dashboard of the vehicle, or be a stand-alone display, or be a portable display unit such as a PDA (personal digital assistant), to display the status of the security system, and also possibly video images provided by the security system video cameras. This enables the person or homeowner to review the status of the security system, and also possibly review video images taken by the security system video cameras, before entering the premises to determine if it is safe to enter.

In addition, the Wi-Fi enabled processor and display can be used when entering or exiting the security system protected property to view areas with obscured visibility. For example, a security video camera may be positioned to provide a display of the driveway and the adjacent street and sidewalk. Before exiting a driveway the homeowner/person might view the display of the driveway and the adjacent street and sidewalk on the video monitor/display, thereby alerting the driver to possible problems with pedestrians or oncoming traffic.

Moreover, the Wi-Fi transmissions can be encrypted such that only an authorized receiver or receivers can decode the information. Furthermore, the transmissions can be encrypted with a personal ID such that only a specific user(s) can receive the specific transmission. Several different vehicles or persons, with the same or a different personal ID, can have a Wi-Fi enabled processor and video display.

The present invention can provide more comprehensive control of the security system wherein the Wi-Fi enabled processor and video display might be utilized to transmit data commands to the security panel, for example to transmit an arm command or a disarm command to respectively arm or disarm the security system, or particular zones of the system, or to turn on or off selected lights, or to open or close a garage door.

The Wi-Fi transmitted commands might also be somewhat unrelated to the security system, for example to request a transmission by the security system control panel of other data and messages, for example email, and the control panel, which typically has internet and telephone or cable access, would respond to the request with a transmission of the requested data. The commands might also be related to the functions of a more integrated security and HVAC system, for example to request a transmission by the security system control panel of HVAC related data and messages, such as temperature or thermostat temperature settings. The commands might also be to control the HVAC system, such as to change the settings thereof, and the control panel would respond to the request by transmitting appropriate commands to the HVAC equipment connected to the data network at the premises.

While several embodiments and variations of the present invention for a Wi-Fi premises to vehicle telemetrics interface are described in detail herein, it should be apparent that the disclosure and teachings of the present invention will suggest many alternative designs to those skilled in the art.

What is claimed is:

1. A Wi-Fi premises to vehicle interface, comprising:
   a security system for the premises including a control panel and security sensors for detecting security/alarm events;
   a Wi-Fi transceiver, processor and video display disposed in a vehicle to enable the receipt and display of Wi-Fi transmitted data on the status of the security system; and
   an interface between the security system and the vehicle, including a Wi-Fi base station, for providing a transmission link for Wi-Fi transmitted data between the security system and the vehicle, wherein the interface enables the security system to monitor the status of the vehicle and control functions of the vehicle by using Wi-Fi transmitted data.

2. The Wi-Fi premises to vehicle interface of claim 1, wherein the video display is integrated into the dashboard display of the vehicle.

3. The Wi-Fi premises to vehicle interface of claim 1, wherein the video display is a stand-alone display.

4. The Wi-Fi premises to vehicle interface of claim 1, wherein the video display is a portable display unit.

5. The Wi-Fi premises to vehicle interface of claim 1, wherein the security system includes at least one security video camera for taking video frames, and the video display displays the video frames taken by the at least one security video camera.

6. The Wi-Fi premises to vehicle interface of claim 1, wherein the interface enables the status of the security system to be monitored from the vehicle by Wi-Fi transmitted data before a home-owner enters the residence protected by the security system.

7. The Wi-Fi premises to vehicle interface of claim 1, wherein the interface enables the security system to be controlled from the vehicle by Wi-Fi transmitted data.

8. The Wi-Fi premises to vehicle interface of claim 1, wherein the interface enables Wi-Fi transmitted data communications between the vehicle and a security and HVAC (heating, ventilation, air conditioning) system.

9. The Wi-Fi premises to vehicle interface of claim 1, wherein the vehicle processor is connected to a vehicle communication bus that is connected to sensors that monitor the status of the vehicle, and the interface enables the status of the vehicle to be displayed on a display of the security system.

10. The Wi-Fi premises to vehicle interface of claim 1, wherein the security system control panel is connected to a network via an Ethernet or similar protocol, and the user interface treats the vehicle as a partition with different zone types being displayed locally.

11. The Wi-Fi premises to vehicle interface of claim 1, wherein the Wi-Fi transmitted data transmissions are encrypted data transmissions such that only an authorized receiver can receive and decode the encrypted data transmissions.

12. A method of providing a Wi-Fi interface between a premises and a vehicle, comprising:
    providing a security system for the premises including a control panel and security sensors for detecting security/alarm events;
    providing a Wi-Fi transceiver, processor and video display disposed in the vehicle to enable the receipt and display of Wi-Fi transmitted data on the status of the security system; and
    providing a Wi-Fi interface between the security system and the vehicle, including a Wi-Fi base station, to provide a transmission link for Wi-Fi transmitted data between the security system and the vehicle, wherein the interface enables the security system to monitor the status of the vehicle and control functions of the vehicle by using Wi-Fi transmitted data.

13. The method of claim 12, including integrating the video display into the dashboard display of the vehicle.

14. The method of claim 12, including providing the video display as a stand-alone display.

15. The method of claim 12, including providing the video display as a portable display unit.

16. The method of claim 12, including providing the security system with at least one security video camera for taking video frames, and the video display displaying the video frames taken by the at least one security video camera.

17. The method of claim 12, including monitoring the status of the security system from the vehicle by Wi-Fi transmitted data before a home-owner enters the residence protected by the security system.

18. The method of claim 12, including controlling the security system from the vehicle by Wi-Fi transmitted data.

19. The method of claim 12, including transmitting Wi-Fi data communications between the vehicle and a security and HVAC (heating, ventilation, air conditioning) system.

20. The method of claim 12, including connecting the vehicle processor to a vehicle communication bus that is connected to sensors that monitor the status of the vehicle, and displaying the status of the vehicle on a display of the security system.

21. The method of claim 12, including connecting the security system control panel to a network via an Ethernet or similar protocol, and treating the vehicle as a partition with different zone types being displayed locally.

22. The method of claim 12, including encrypting the Wi-Fi transmitted data transmissions such that only an authorized receiver can receive and decode the encrypted Wi-Fi data transmissions.

* * * * *